US 6,666,508 B1

(12) United States Patent
Hofmann et al.

(10) Patent No.: US 6,666,508 B1
(45) Date of Patent: Dec. 23, 2003

(54) CRASH LOCKING MECHANISM FOR AN ADJUSTMENT DEVICE OF AN AUTOMOBILE SEAT

(75) Inventors: Jochen Hofmann, Kueps (DE); Gregor Kroener, Bischberg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/913,178
(22) PCT Filed: Mar. 17, 2000
(86) PCT No.: PCT/DE00/00851
§ 371 (c)(1), (2), (4) Date: Aug. 9, 2001
(87) PCT Pub. No.: WO00/55004
PCT Pub. Date: Sep. 21, 2000

(30) Foreign Application Priority Data

Mar. 17, 1999 (DE) ......................... 199 11 786

(51) Int. Cl.⁷ ................................ B60N 2/16
(52) U.S. Cl. ............... 297/216.1; 297/344.15
(58) Field of Search ............ 297/216.1, 330, 297/344.15, 344.17; 248/424, 429, 419

(56) References Cited

U.S. PATENT DOCUMENTS

| 3,207,549 A | * | 9/1965 | Posh ......................... 296/68.1 |
| 3,514,155 A | | 5/1970 | Close |
| 3,897,101 A | * | 7/1975 | Hess ......................... 296/68.1 |
| 4,191,399 A | * | 3/1980 | Garvey et al. .............. 280/806 |
| 4,225,177 A | * | 9/1980 | Kluting .................. 297/378.11 |
| 4,664,442 A | * | 5/1987 | Stolper et al. ......... 297/216.18 |
| 4,790,597 A | | 12/1988 | Bauer et al. |
| 5,163,736 A | | 11/1992 | Alijundi |
| 5,301,569 A | | 4/1994 | Droulon |
| 5,362,124 A | * | 11/1994 | Schlidt ......................... 297/95 |
| 5,697,674 A | * | 12/1997 | Aufrere et al. ......... 297/344.15 |
| 5,782,533 A | | 7/1998 | Fischer et al. |
| 5,813,726 A | * | 9/1998 | Husted .................. 297/378.11 |
| 5,826,936 A | * | 10/1998 | Scordato et al. ......... 297/216.1 |
| 5,882,061 A | | 3/1999 | Guillouct |
| 5,884,972 A | | 3/1999 | Deptolla |
| 6,247,752 B1 | * | 6/2001 | Bowers .................... 297/216.1 |

FOREIGN PATENT DOCUMENTS

| DE | 36 42 349 | 5/1988 |
| DE | 44 08 219 | 9/1995 |
| DE | 196 52 946 | 1/1998 |
| DE | 196 52 665 | 5/1998 |
| EP | 0 559 566 | 9/1993 |
| EP | 0 806 319 | 11/1997 |

OTHER PUBLICATIONS

English translation of International Preliminary Examination Report for corresponding PCT/DE00/00851.

* cited by examiner

Primary Examiner—Peter M. Cuomo
Assistant Examiner—Joseph Edell
(74) Attorney, Agent, or Firm—Christie, Parker & Hale, LLP

(57) ABSTRACT

The invention relates to a crash locking mechanism for an adjustment device of an automobile seat, with a triggering body having a triggering mechanism mounted for swivel movement on a part of the seat frame and which when a predetermined crash load is exceeded leaves the rest position as a result of its inertial energy, whereby a positive fit locking of the adjustment device is made possible by means of at least one locking element, and is characterised in that the triggering mechanism (4) when the predetermined crash load is exceeded can be uncoupled from the at least one locking element (44a, 44b) which is spring elastically pretensioned in the locking direction. A retaining element (412a, 412b) which is associated with the locking element (44a, 44b) can be controlled by the triggering body (41) to which the spring force of the pretensioned locking element is applied. Furthermore a connecting link (410) and spring-loaded holding element (42) acting thereon is provided interacting with the triggering body (41) in order to be able to adapt the triggering energy and the triggering time exactly to the different requirements.

38 Claims, 10 Drawing Sheets

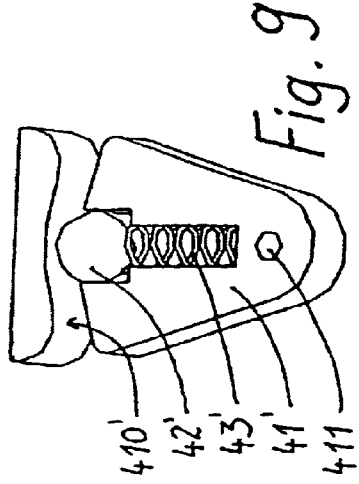
Fig. 8
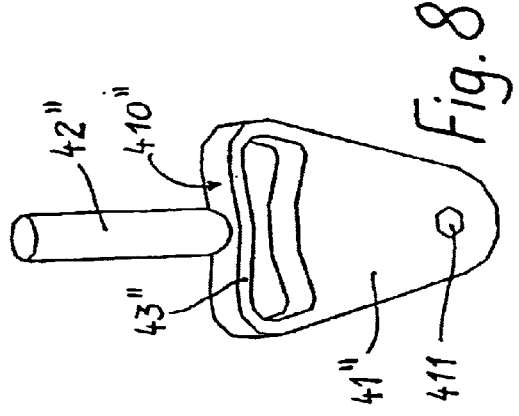
Fig. 10
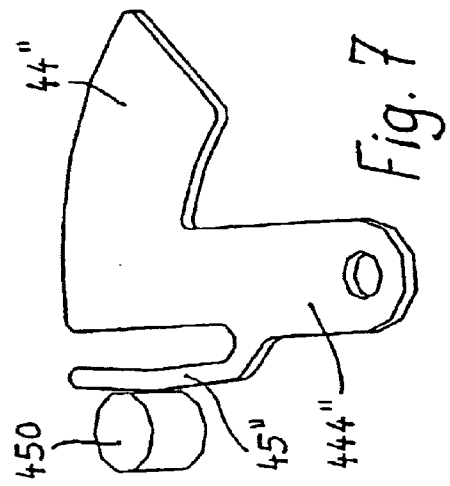
Fig. 9
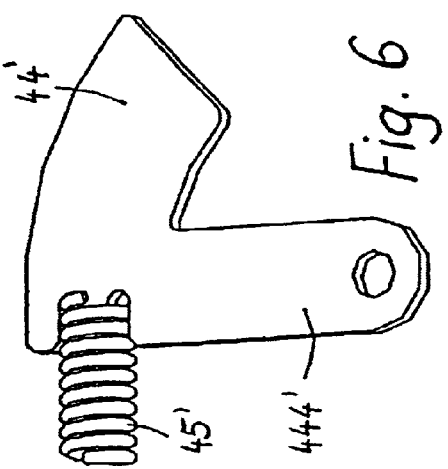
Fig. 6
Fig. 7

CRASH LOCKING MECHANISM FOR AN ADJUSTMENT DEVICE OF AN AUTOMOBILE SEAT

CROSS-REFERENCE TO RELATED APPLICATION

This application claims priority of International application number PCT/DE00/00851, filed Mar. 17, 2000, which in turn claims priority to German patent application number 199 11 786.1, filed Mar. 17, 1999.

DESCRIPTION

The invention relates to a crash locking mechanism for adjustment devices of automobile seats.

Adjustment devices of automobile seats have to meet high safety requirements in order that the permissible extent of seat movement is not exceeded in the event of a crash, which would otherwise lead to a considerably increased risk of danger. Particularly great are the forces which have to be absorbed in the event of a front impact crash through a so-called belt-integrated seat because the forces which emanate from the seat user are introduced into the seat frame structure through one or more belt connecting points. In the case of motorized adjustable seats the gears therefore have to be dimensioned for an extreme crash case, which leads to considerable extra expense.

A seat of this generic kind is known from DE 44 08 219 A1. It combines the height adjustment device with an arrester device which is to prevent the adjustment device from moving beyond a certain maximum extent. The solution described is indeed suitable to prevent the seat from leaving a predetermined characteristic field in the event of a front impact crash but one and the same arrester device cannot be used at the same time also to restrict the consequences of a rear impact crash. Furthermore the arrester device only acts at the limit of displacement of the adjustment device.

From DE 36 42 349 C2 a height adjustable vehicle seat is known with a belt attachment on the top rail of the horizontal seat adjuster. The relevant belt plate is formed in two parts displaceable relative to each other with the part fixed on the top rail having a saw-tooth like serration into which the positive locking elements of the other part which is fixed on the seat frame and is displaceable relative thereto can engage in the event of a crash. During normal operation guide elements prevent undesired engagement of the positive locking elements. In the event of a crash there results a swivel movement of the part of the belt plate fixed on the seat frame so that the guide elements become destroyed and the positive locking elements move into engagement.

The drawback here is that the security device only comes into effect after considerable belt forces have already occurred. Furthermore the device cannot produce any effect in the event of a rear-impact crash and stresses caused by loaded goods.

From DE 196 52 946 C1 a detent device is known for locking an incline-adjustable backrest of a motor vehicle seat in dependence on exceeding an acceleration value which appears in the longitudinal direction of the vehicle, wherein an eccentric flywheel weight is guided on a threaded section on the rotationally secured swivel axis of an articulated joint which consists of a part fixed on the seat and a part fixed on the backrest. In the event of a crash the flywheel weight moves through displacement on the threaded section to adjoin projections of a pressure plate which is axially displaceable on the swivel axis and whose projections pass with keyed engagement through the part of the joint fixed on the seat. Detent members provided on the pressure plate thereby come into engagement with detent means on the part of the joint fixed on the backrest so that the joint provided between the seat part and backrest is locked in the event of a crash.

The object of the invention is to develop a crash locking mechanism for adjustment devices of motor vehicles which by utilising the inertial forces which occur in the event of a crash has increased functioning reliability and can be adapted to different adjustment devices of a motor vehicle seat. Furthermore the new crash locking device is to be designed where necessary so that only one single device can act for both a front impact crash and a rear impact crash.

The solution according to the invention provides a crash locking mechanism for adjustment devices in motor vehicles which by utilising the inertial forces which occur in the event of a crash has an increased functioning reliability, can be adapted to different adjustment devices of an automobile seat and which can be designed where necessary so that only one single device of this kind can be effective for both a front impact crash and a rear impact crash.

According to the solution according to the invention the triggering mechanism of the crash locking mechanism can be uncoupled from the or each locking element on exceeding a predetermined crash load, wherein the locking elements are spring elastically pre-stressed in the locking direction and after their uncoupling from the triggering mechanism automatically and irreversibly produce the locking state.

The triggering mechanism has a triggering body which as a result of the inertial forces which occur in the event of a crash can leave its rest position and thereby control a retaining element associated with the locking element and to which the spring force of the pre-stressed locking element is applied. If the retaining element is shifted to inoperative then the crash locking mechanism becomes activated as a result of the spring tension acting on the locking element.

The retaining element is preferably connected in keyed engagement with the locking element, with the keyed connection being releasable, controlled by the triggering body.

Basically the triggering conditions can be set to correspond with each other for a front impact crash or a rear impact crash. In order to differentiate between a front impact crash and rear impact crash to trigger the crash locking mechanism the triggering mechanism and/or the connection between the triggering mechanism and the retaining element is formed so that the triggering energy or triggering time can be changed in dependence on the site of impact, namely a rear impact crash or a front impact crash.

The positive locking connection between the retaining element and the triggering body can be formed either in a fixed connection between retaining element and triggering body, in particular by designing the retaining element as an integral constituent part of the triggering body, or by mutual locking of the retaining element and triggering body.

Accordingly in a first embodiment the triggering mechanism has a connecting link which has in relation to the axis of rotation of the swivel mounted triggering body areas with radially changing spacing. The maximum or minimum area thereby formed is adjoined by areas with lesser or greater distance from the axis of rotation. This connecting link is allocated a resilient holding element which in the rest position of the triggering body engages in the maximum or minimum area of the connecting link. If now the triggering body swivels out of its rest position as a result of a sufficiently large inertial force then it is guided under the increase of the spring force acting on the connecting link over the area of the connecting link adjoining the maximum or minimum area.

It is hereby additionally reached that through a suitably shaped contour of the connecting link (and the spring force corresponding thereto for the holding element which is to be pre-stressed as well as the dimensioning of the acceleration-sensitive triggering body) it is possible to produce a deliberate influence on the triggering force and the triggering timing. This provides the invention with the possibility of being able to meet practically any requirement and thus to reduce the risk of injury for the seat user.

If the described connecting link is provided on each side of the maximum or minimum areas with adjoining areas through which the resilient holding element can be guided in dependence on the direction of the crash forces and the triggering body is mounted to swivel in both directions, then one and the same crash locking mechanism can then become active to secure the seat adjustment device in the event of front and rear impact crashes. Depending on the actual requirements the connecting link can be formed symmetrical or asymmetrical relative to the maximum/minimum areas. The latter is advisable if different conditions have to be taken into account for front and rear impact crashes. As a result of the shorter relative movements of an occupant in respect of the back rest following a rear impact crash compared with the opposite direction up to a taut seat belt, it seems sensible to dimension the triggering mechanism for a rear impact crash so that the triggering energy is increased compared to a front impact crash and the triggering time is shortened.

The greater the amount of triggering energy required for the triggering mechanism so the steeper is the incline of the areas adjoining the minimum/maximum area. Naturally the contour, material and design of the holding element which is in engagement with the connecting link, all have a part to play in this connection. Thus for example by using a holding element in the form of a bolt which forms a friction partner with the connecting link, it is necessary to expect a higher amount of triggering force than in the case of a holding element with rolling guide.

The length of the connecting link is suitable for determining the switching time. The length of the areas adjoining the maximum/minimum area should be selected longer the greater the desired period of time from the start of a crash up to the release of the detent movement of the locking elements.

Ideally the length of the area of the connecting link adjoining the maximum/minimum area, and the interaction of the retaining elements and the locking elements are matched with each other so that the detent movement of the locking elements starts on overstepping the free end of the connecting link.

In a second embodiment the retaining element and the triggering body can be mutually locked by positive and/or force locking connection whereby the mutual locking action is lifted when the predetermined crash load is exceeded.

This mutual locking of the retaining element and triggering body is designed on the mouse trap principle. The retaining element which holds the or each locking element in the tensioned state is thereby locked in the rest state in positive and/or force-locking engagement with the triggering body. In the event of movement of the triggering body conditioned by inertia on exceeding the predetermined crash load, this mutual locking of the retaining element and triggering body is lifted so that the retaining element releases the or each pretensioned locking elements for the crash locking mechanism. The path of movement during lifting of the mutual locking thereby proceeds analogous with the triggering of a mouse trap.

In order to uncouple the direction of movement of the triggering body from that of the retaining element, a detent element which can swivel about a detent element axis is mounted between the retaining element and triggering body and has an end face of a first contact area adjoining the triggering body, and a second contact area which forms the lock with the retaining element. This configuration makes it possible to pre-stress the detent element independently of the triggering body in order to secure the force and/or positive locking connection with the retaining element. For this purpose the detent element is spring-loaded in the swivel direction about its detent element axis.

The mutual locking between the detent element and the retaining element is through a small surface so that the friction between the interengaging locking surfaces of the retaining element and detent element have negligible effect on the triggering of the crash locking mechanism.

For this purpose the retaining element is able to swivel about a retaining element axis running substantially parallel to the detent element axis and has at least one shoulder adjoining a collar of the at least one locking element, and a web adjoining a nose of the detent element and spring tensioning.

In order to produce the mutual locking between the retaining element and detent element the shoulder and the web of the retaining element are mounted on one side of the retaining element axis, and a tension lever is mounted on the other side of the retaining element.

In the tensioned state of the crash locking mechanism the end faces of the nose of the detent element and web of the retaining element thereby abut one another with force-locking engagement.

In this embodiment of the invention the triggering body preferably consists of an inertia element capable of swivelling about a rotational axis and having a mass element remote from the axis and a bearing area which is arranged about the axis of rotation of the inertia element. The triggering mechanism can thereby be designed so that in the tensioned state of the crash locking mechanism the end face of the first contact area of the detent element adjoins an end face of the bearing area of the inertia element, and the position of the detent element can be changed in relation to the axis of rotation of the inertia element.

With a symmetrical position of the end face of the first contact area of the detent element in respect of the axis of rotation of the inertia element the triggering conditions which apply for the crash locking mechanism are the same in the case of a rear impact or front impact crash. With an asymmetric arrangement of the end face of the first contact area of the detent element in respect of the axis of rotation of the inertia element different triggering conditions are produced for the crash locking mechanism depending on a front impact crash or rear impact crash.

Even with this embodiment two locking elements are preferably arranged side by side wherein two shoulders of the retaining element designed around recesses are provided between which is mounted the web of the retaining element which can be locked in force locking and/or positive locking engagement with the nose of the detent element.

There are various ways open for the structural design of the embodiments described above; thus for example the connecting link can be a constituent part of the triggering body and the resiliently mounted retaining element is supported on the seat frame. Conversely however the connecting link can also be mounted on the side part and the resiliently mounted holding element can be supported on or in the triggering body. Different variations are also available for producing the spring pre-tension between the holding element and connecting link. This can be achieved for example by a separate spring element, through a spring clip forming the connecting link or through the elastic bending of a spring arm.

In order to be able to ensure a high reaction speed of the crash locking mechanism and to minimize the space required, the mass and volume of the locking elements which are to be shifted should be as small as possible. The thereby restricted mechanical bearing capacity must not limit the effectiveness of the crash locking mechanism. If the locking elements are only strained to shear strength, the material used can be utilised to optimum extent. For this a multi push-through connection is suitable so that the locking element in the crash locking state engages through a detent opening in the seat frame (e.g. in the side part), through a detent opening in a part connected to the seat frame, as well as through a detent opening in a part fixed on a base part (e.g. on the top rail 2) of the seat.

The detent openings of the part connected with the base part should be substantially larger than the detent openings on the side of the seat frame, e.g. 1.5 to 2 times as large, and have a division which differs from the division of the locking elements so that in each and every adjusted position of the seat adjustment device at least one locking element can snap fit into a detent opening of the part connected with the base part.

The invention will now be explained in further detail with reference to the embodiments and the drawings in which:

FIG. 6 shows a swivel locking element with separate compression spring;

FIG. 7 shows a swivel locking element with integrated compression spring;

FIG. 8 shows a triggering body with integrated spring and connecting link area;

FIG. 9 shows a triggering body with holding element mounted therein and spring-tensioned against a connecting link on the side of the seat frame;

FIG. 10 shows a locking element tensioned on one side and having a lever arm formed as a compression spring;

Figure 1:
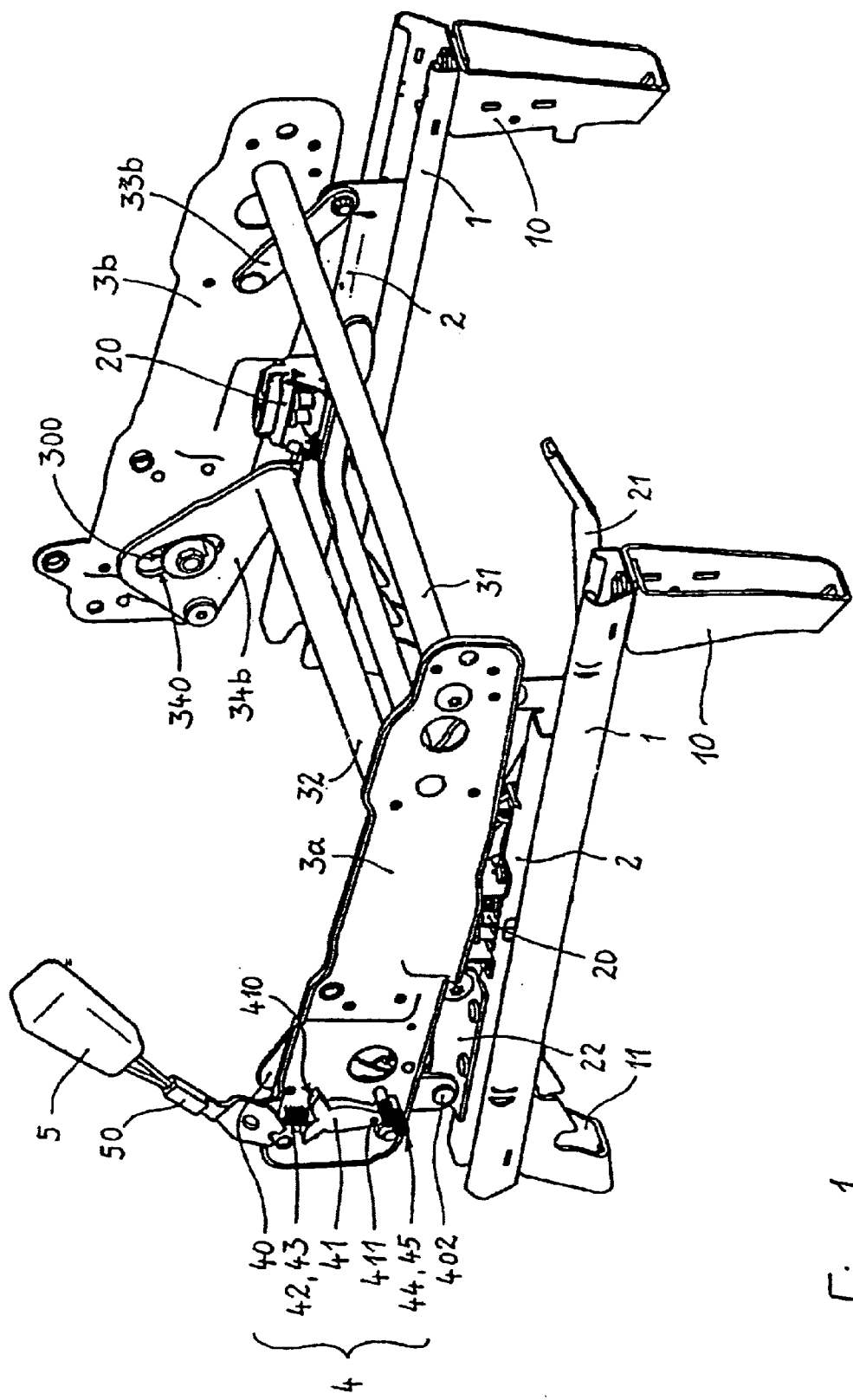
FIG. 1 shows a perspective view of a seat lower frame with an adjustment device for adjusting the seat height in a view from the side of the outer parts of the crash locking mechanism.
Figure 2:
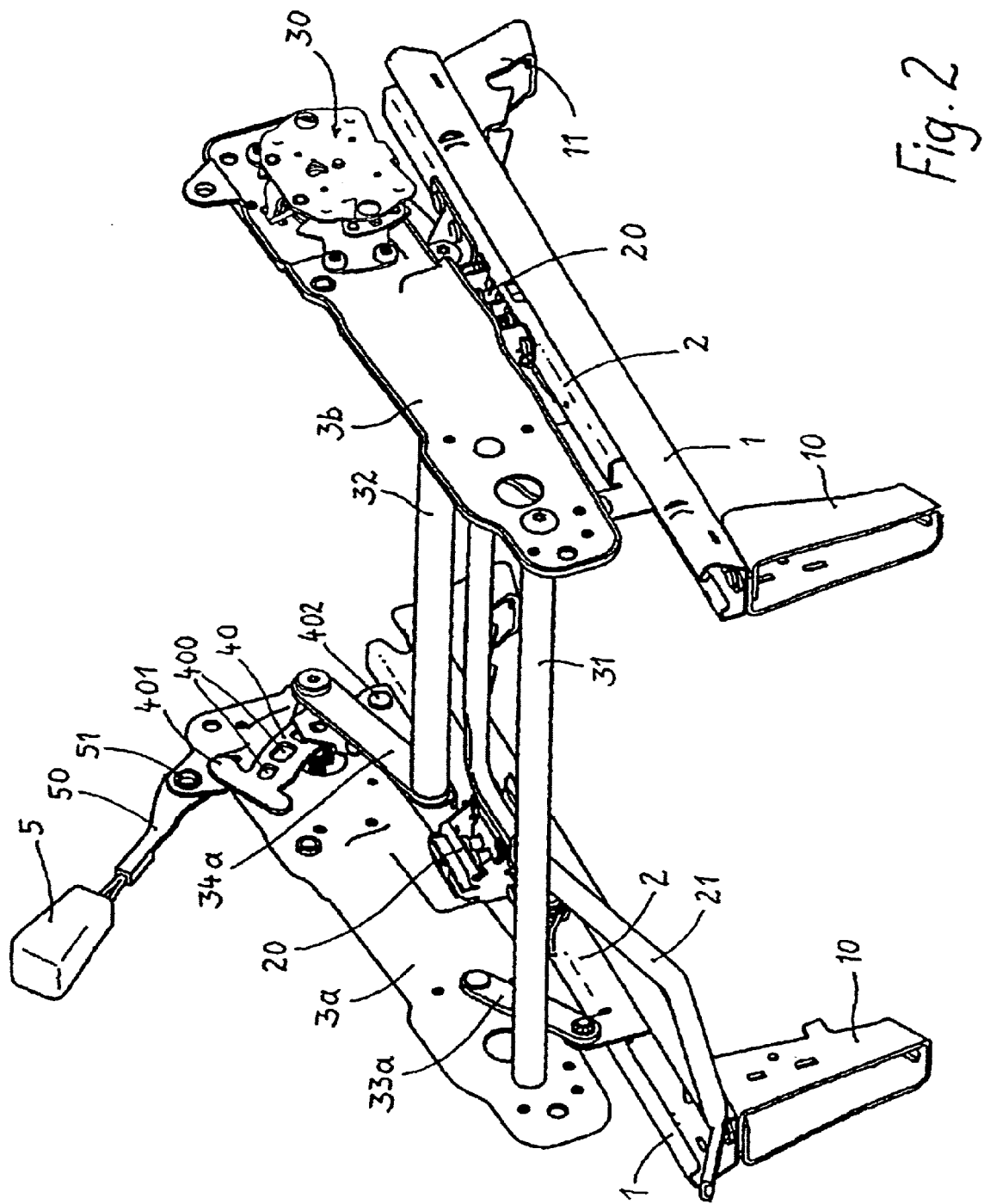
FIG. 2 shows a perspective view of a seat lower frame with an adjustment device for adjusting the seat height in a view from the side of the inner parts of the crash locking mechanism.

The embodiments selected to explain the crash locking mechanism 4 and illustrated in FIGS. 1 and 2 relate to a seat lower frame having an adjustment device 30 for adjusting the seat height. The seat frame is basically comprised of parallel guide rails 1, 2 whose bottom rails 1 are connected to the vehicle floor by floor fasteners 10, 11. The top rails 2 guided thereon are lockable together through manually operable locking devices 20. The drive levers 34a, 34b which in turn are coupled by a cross tube 32, and the compensating levers 33a, 33b connect the top rails 1, 2 for articulated movement to the side parts 3a, 3b.

Through the adjustment device 30 mounted on the side part 3b the drive force is transferred through a pinion 300 to a toothed segment 340 of the drive lever 34b and then directed through the cross tube 32 to the drive lever 34a of the opposite side. In the rear area of the side part 3a the belt lock 5 is fixed by means of a belt lock holding angle 50. In order that the high crash forces which are to be expected in this area can be safely transferred a holding angle 22 is provided there to increase the stress handling capacity.

Figure 3:
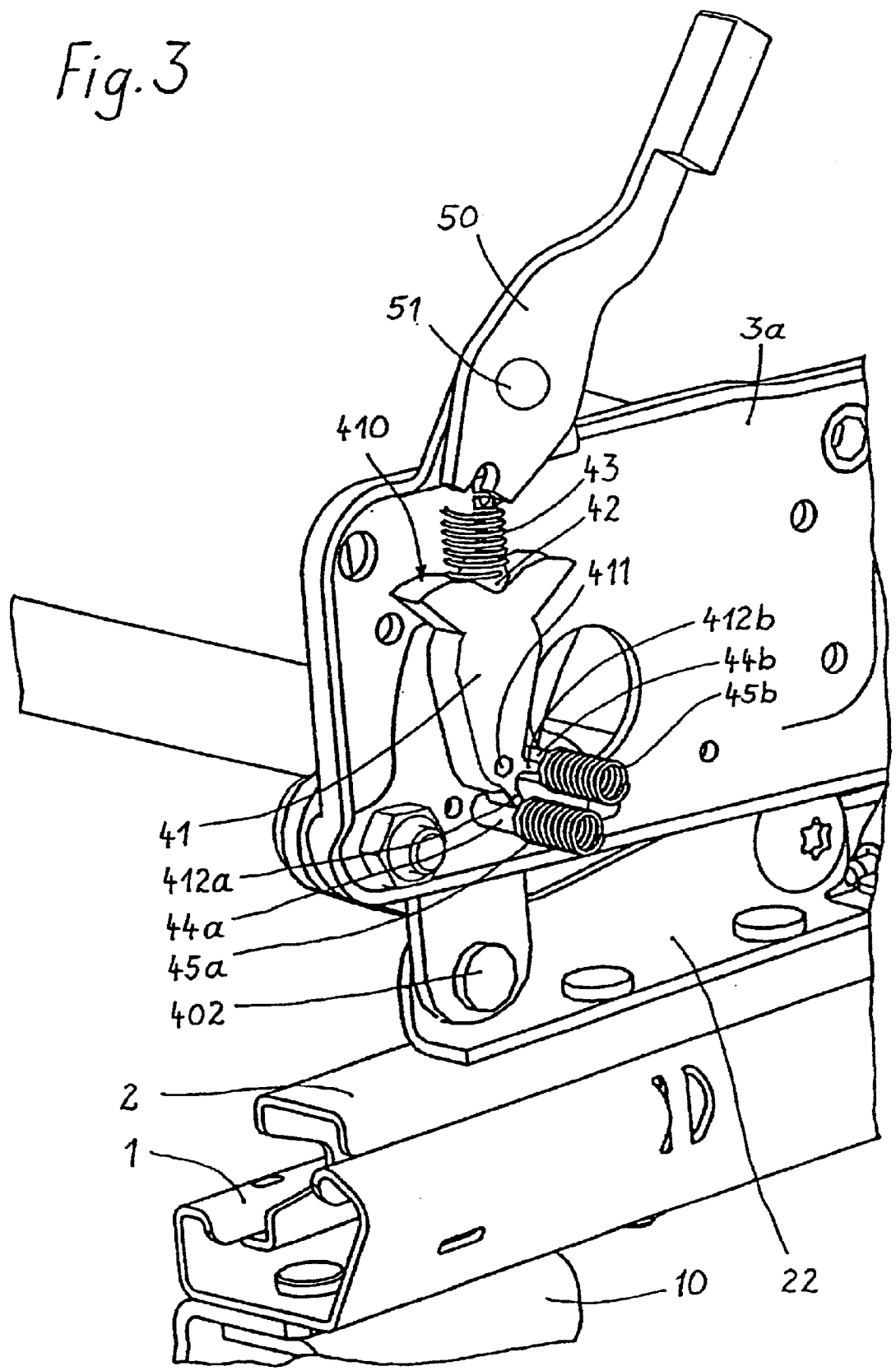
FIG. 3 shows an enlarged section of the crash locking device in a view from outside.
Figure 4:
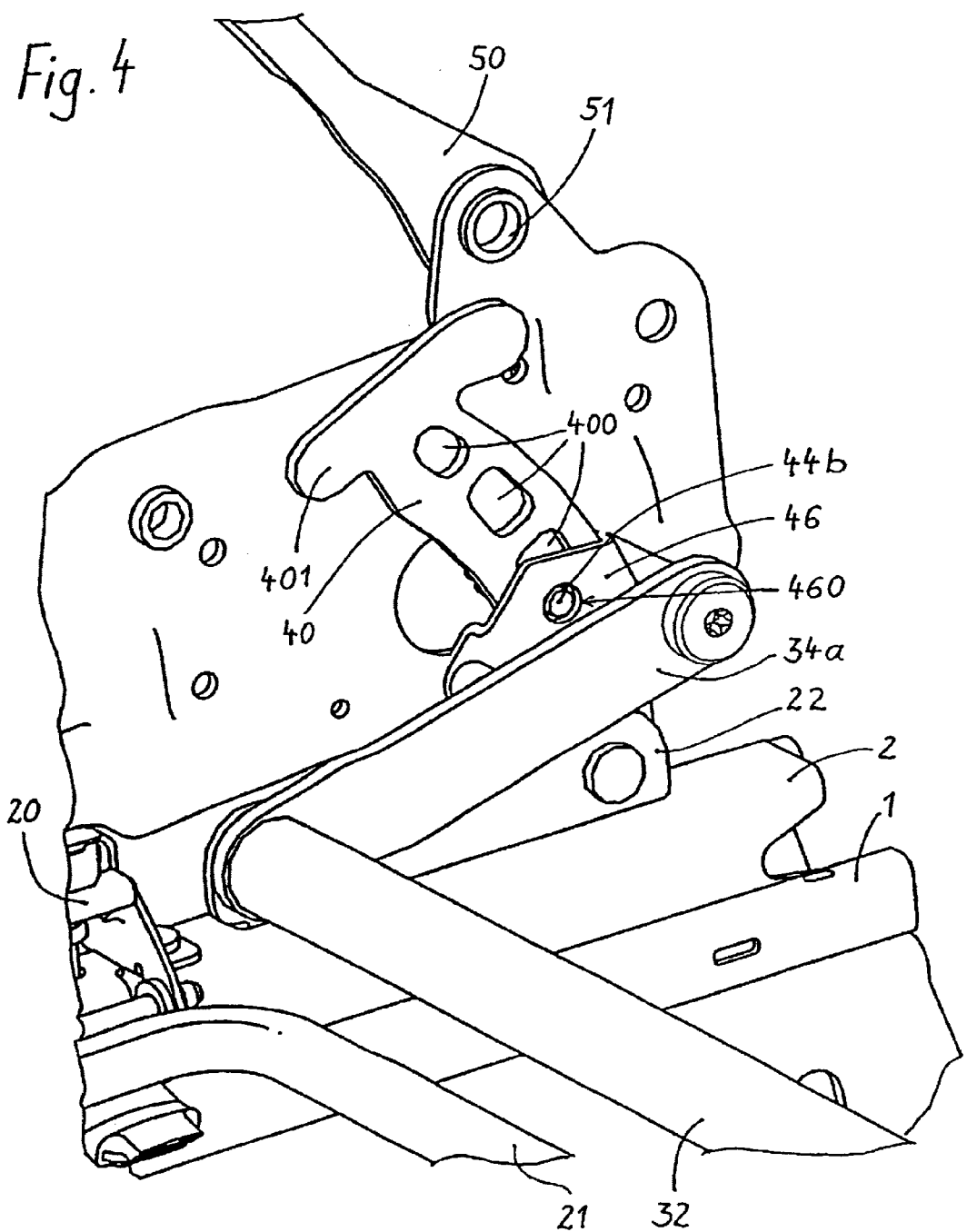
FIG. 4 shows an enlarged section of the crash locking mechanism in a view from inside.
Figure 5:
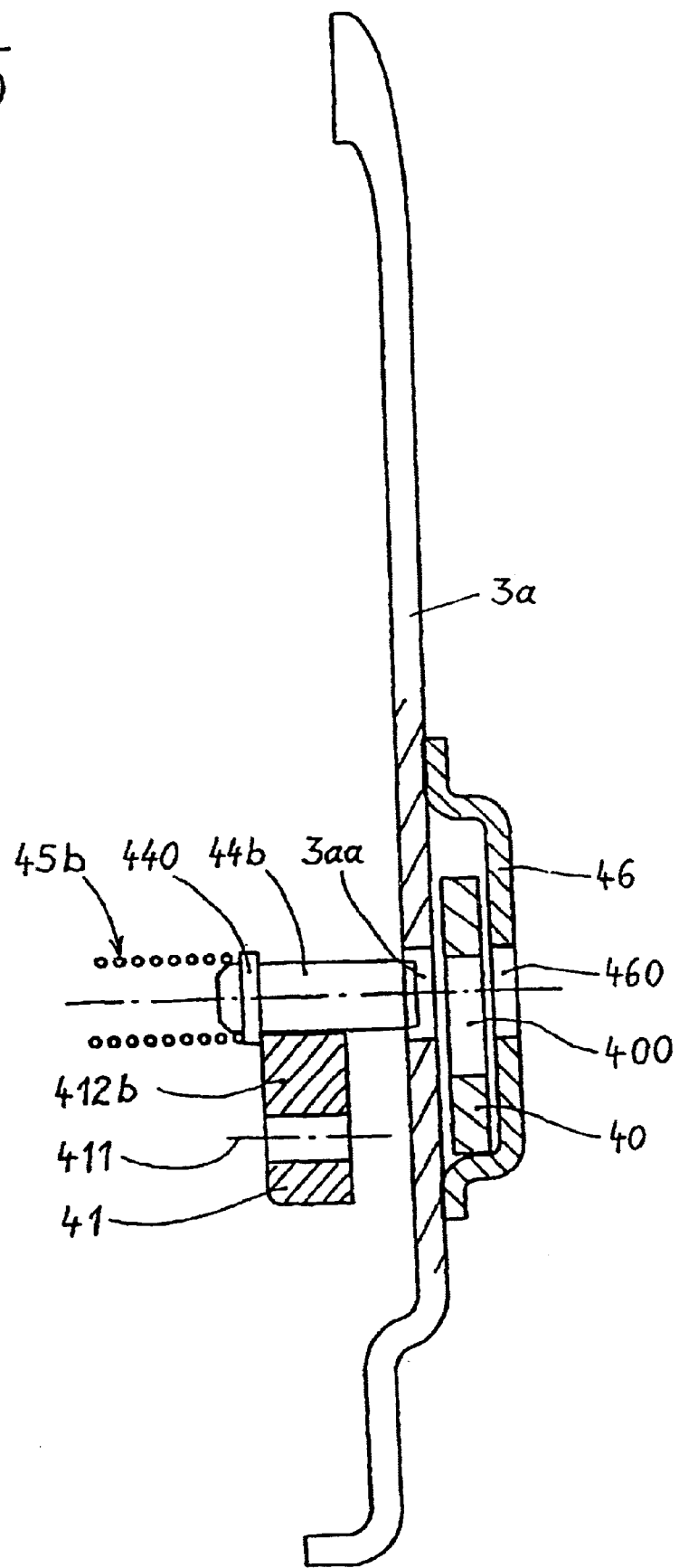
FIG. 5 shows a cross-sectional view through the crash locking mechanism along the longitudinal axis of the retaining nose.
Figure 11:
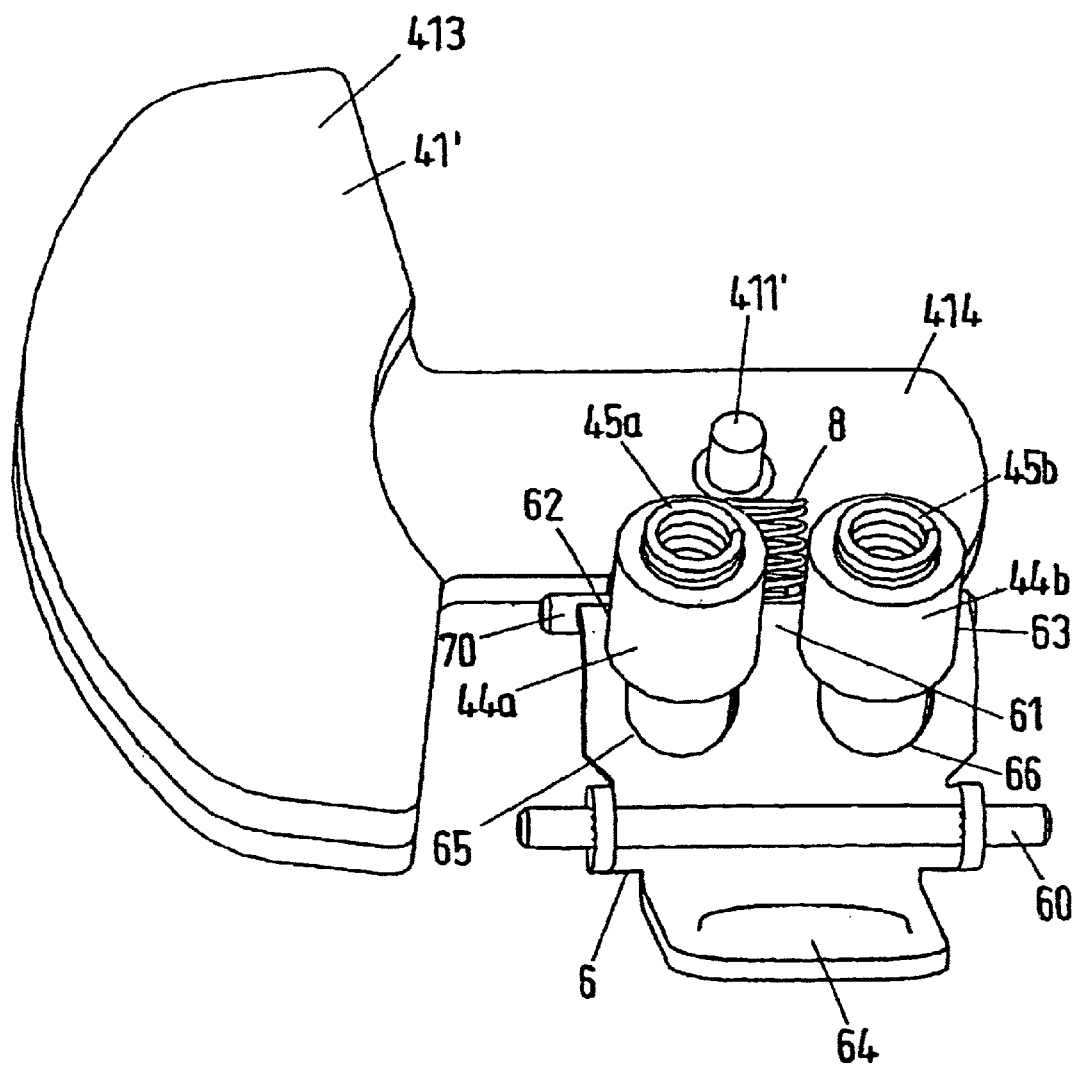
FIGS. 11 to 17 show different perspective views and plan views of an embodiment of the invention with mutual locking of the retaining element and triggering body or a detent element.
Figure 12:
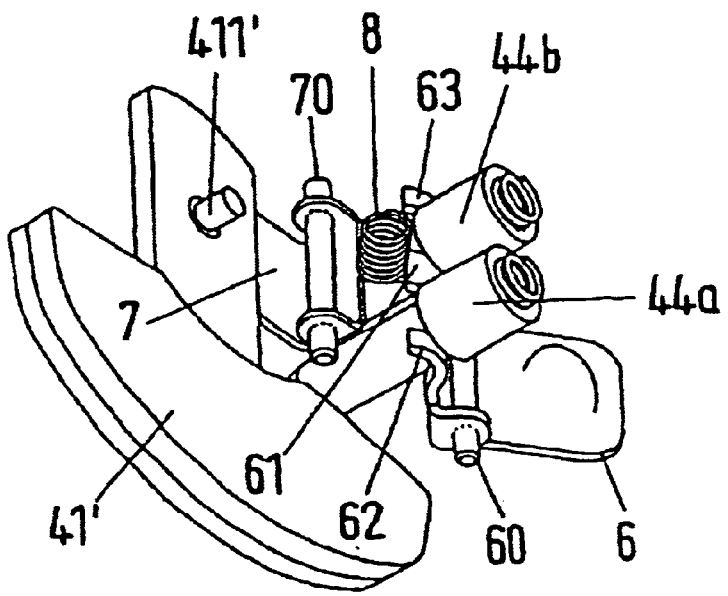
Figure 13:
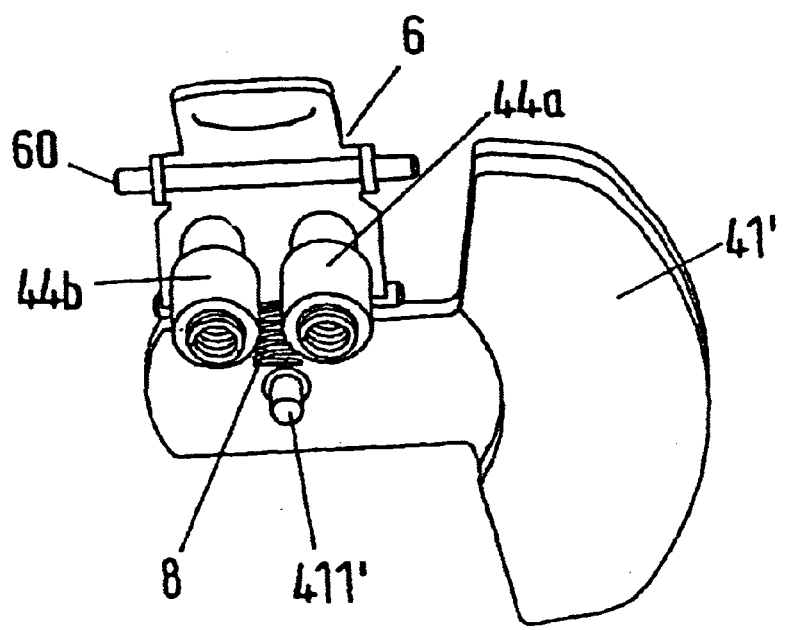
Figure 14:
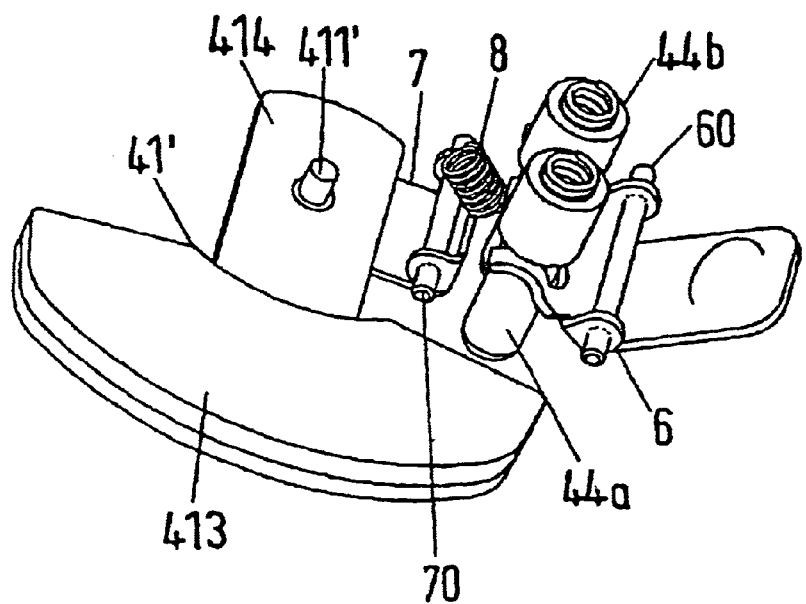
Figure 15:
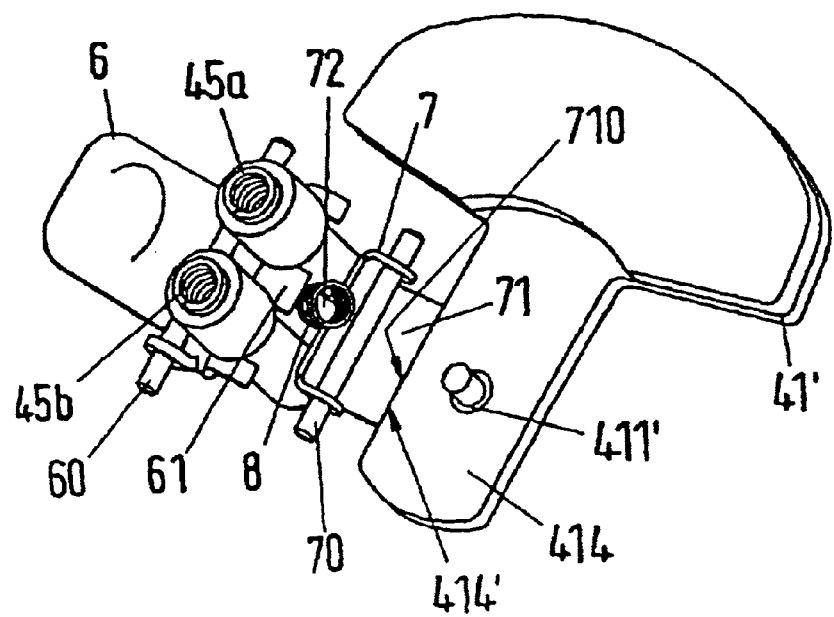
Figure 17:
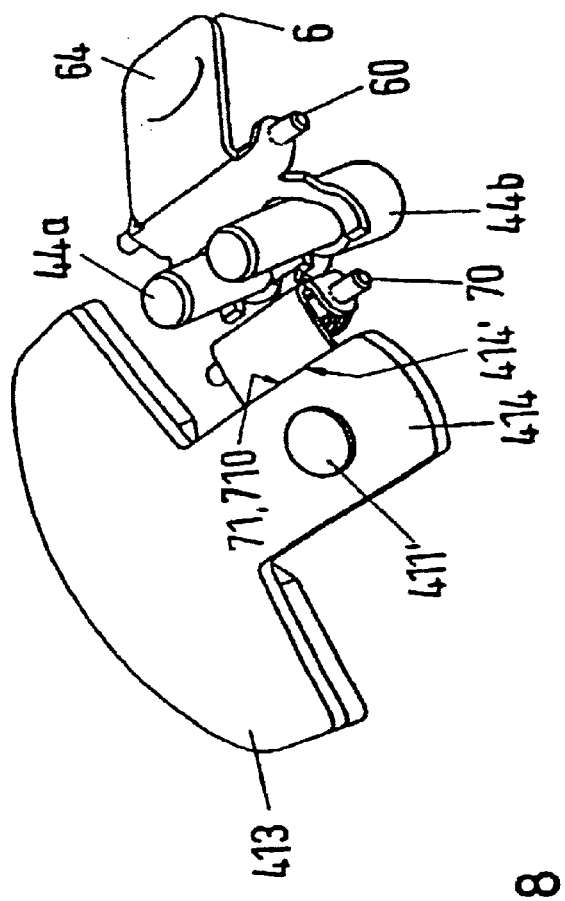

The area of maximum stress is fitted with the crash locking mechanism in order to prevent any vertical or forward movement of the seat as a result of a crash. It consists basically of a triggering mechanism 4, which includes in a first embodiment of the invention illustrated in detail in FIGS. 3 to 5 the triggering body 41 which is movable by the inertial force, the retaining noses 412a, 412b which are formed thereon, the connecting link 410 which is likewise formed thereon as well as the holding element 42 which is spring-loaded by the spring 43 against the connecting link 410, and also consists of a locking mechanism which in turn comprises the locking bolts 44a, 44b prestressed by the springs 45a, 45b in the locking direction, as well as the detent openings 3aa, 400, 460 of the parts 3a, 40, 46.

The triggering body 41 is mounted for swivel movement on the rotary axis 411 on the side part 3a. In its upper area there is a symmetrically shaped connecting link 410 which consists of a central concave connecting link area (minimum area) lying in the vertical axis of the triggering body 41, and of convex areas following on on both sides. A spring 43 is supported on the side part 3a and presses the holding element 42, formed as a ball, into the central minimum area of the connecting link 410.

With the introduction following a front or rear impact crash of accelerating forces on the triggering body 41 it is possible that this may move out from its (illustrated) rest position so that an increasingly greater force is required to compress the spring 43 of the holding element 42. On reaching the free end of the connecting link 410 the switching force is at its greatest. On exceeding this point the triggering body 41 changes round and then at the latest releases the pretensioned locking elements 44a, 44b. By matching the parts of the triggering mechanism it is possible to determine the triggering force and thus the required crash energy for activating the crash locking mechanism and the triggering time which is necessary for activation. The combination of these two switching values has the advantage that faulty releases of the device, e.g. through a very short term knock with high energy density but low overall energy content can be eliminated.

In the rest position of the triggering body 41 the retaining noses 412a, 412b engage underneath the collar 440 of the locking bolts 44a, 44b whilst the springs 45a, 45b are supported on the other side. The springs 44a, 44b are supported on a housing (not shown) which encloses all the parts mounted on the outside of the side part 3a.

A detent lever 40 is guided between the side part 3a and a support plate 46 fixed thereon so that in the event of a crash shear stress is produced. The detent lever 40 is fixed by one end on the holding angle 22 whilst at its free end it supports an end stop 401 which defines the maximum possible vertical displacement of the seat.

Detent openings 400 are worked in along the lever for engaging the locking bolts 44a, 44b. These detent openings 400 are significantly larger than the substantially tight-fitting openings 3aa, 460 of the side part 3a and support plate 46. Also the division of the detent openings 400 differs from that of the locking bolts 44a, 44b. A secure locking is thereby to be ensured in each sitting position.

FIGS. 6, 7 and 10 show alternatives to the bolt-like locking elements 44a, 44b. Their detent fingers 44', 44", 44'" form a constituent part of a swivel mounted lever 444', 444", which is pre-stressed in the detent direction by a separate or integral compression spring 45', 45", or a constituent part of a fixedly "tensioned" and spring-elastically curved lever 444'". The detent fingers 44', 44", 44'" are associated with detent openings (not shown) in the side part 3a analogous with the embodiment previously described FIG. 8 shows a triggering body 41" which is able to swivel about a rotary axis 411 and which has a spring clip 43" which forms at the same time the connecting link 410". A connecting link 410" of this kind can be associated with a rigid non-sprung holding element 42". The connecting link 410" changes its contour during the swivel movement of the triggering body 41".

The triggering body 41' which is illustrated in FIG. 9 and is able to swivel about a rotary axis 411 holds in its axial area a spring 43' as well as a spherical holding element 42'. The associated connecting link 410' is mounted or formed on the side part 3a.

A further embodiment of the invention is shown in FIGS. 11 to 18 in various perspective views, plan views and in a side view in which the positive locking connection between a retaining element 6 and a triggering body formed as an inertia element 41' is formed as a mutual locking mechanism with the interposition of a detent element 7. The inertia element 41' is mounted through a rotary axis 411' which is similar to the rotary axis 411 of the first embodiment of the invention described above with reference to the FIGS. 1 to 5, and has a mass element 413 which is removed from the rotary axis 411' and a bearing area 414 which is arranged about the rotary axis 411'.

In the tensioned state of the crash locking mechanism an end face 414' of the bearing area 414 of the inertia element 41' is connected to an end face 710 of a first contact area 71 of the detent element 7 which is able to swivel about a detent element axis 70 which is arranged perpendicular to the rotary axis 411' of the inertia element 41'. On the side of the detent element axis 70 opposite the first contact area 71 of the detent element 7, the detent element 7 has a nose 72 which in the tensioned state of the crash locking mechanism adjoins the end side of a web 61 of the retaining element 6 with force and/or positive locking engagement.

The angular shaped retaining element 6 has two shoulders 62, 63 which are arranged on either side of recesses 65, 66 and hold the locking elements 44a, 44b so that the shoulders 62, 63 adjoin the collar 440 of the locking elements 44a, 44b.

On the side opposite the retaining element axis 60 there is a tension lever 64 with which the locking elements 44a, 44b can be lifted against the spring force of the compression springs 45a, 45b for tensioning the locking elements 44a, 44b.

A compression spring 8 adjoining the nose 72 of the detent element 7 causes the nose 72 of the detent element 7 and the web 61 of the retaining element 6 to be mutually locked at a certain position in the raised state of the locking elements 44a, 44b, i.e. to engage with each other with positive locking and/or force locking connection. This state of the crash locking mechanism which can be seen from the side view according to FIG. 18 corresponds to a tensioned mouse trap where the spring-loaded locking elements 44a, 44b correspond to the mouse trap yoke, the springs tensioning the yoke correspond to the compression springs 45a, 45b, and the detent element 7 with the inertia element 41' correspond to the trigger plate of the mouse trap.

In the rest position of the inertia element 41' the shoulders 62, 63 of the retaining element 6 thus tension the locking elements 44a, 44b against the action of the compression springs 45a, 45b whilst the retaining element 6 is locked through the web 61 with the nose 72 of the detent element 7. The detent element 7 is supported on the other side of the detent element axis 70 through the bearing contact of the end face 710 of the first contact area 71 of the detent element 7 against the end face 414' of the bearing area 414 of the inertia element 41'.

Figure 18:
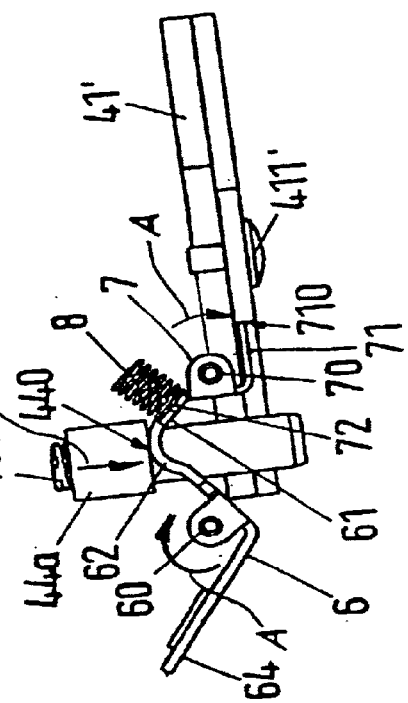
FIG. 18 shows a side view of the embodiment according to FIGS. 11 to 17.

If in the event of a crash the inertia element 41' is swivelled in one or other direction about the rotary axis 411' as a result of the acceleration force acting on the swivel face 413 of the inertia element 41' then the bearing contact of the end face 710 of the first contact area 71 of the detent element 7 is lifted from the end face 414' of the bearing area 414 of the inertia element 41' and thus the counter force of the inertia element 41' causing the mutual locking between the detent element 7 and the retaining element 6 is lifted so that the retaining element 6 and the detent element swivel in the direction of the arrow A marked on FIG. 18, with the result that through the swivel movement of the retaining element 6 the crash locking mechanism is released so that the locking elements 44a, 44b are moved in the direction of the arrow B likewise marked on FIG. 18.

Creating the crash locking action through the release of the locking elements 44a, 44b proceeds according to the embodiment of the invention illustrated above with reference to FIGS. 1 to 5. The locking elements required for the crash locking action can likewise correspond to the locking elements previously described.

Figure 16:
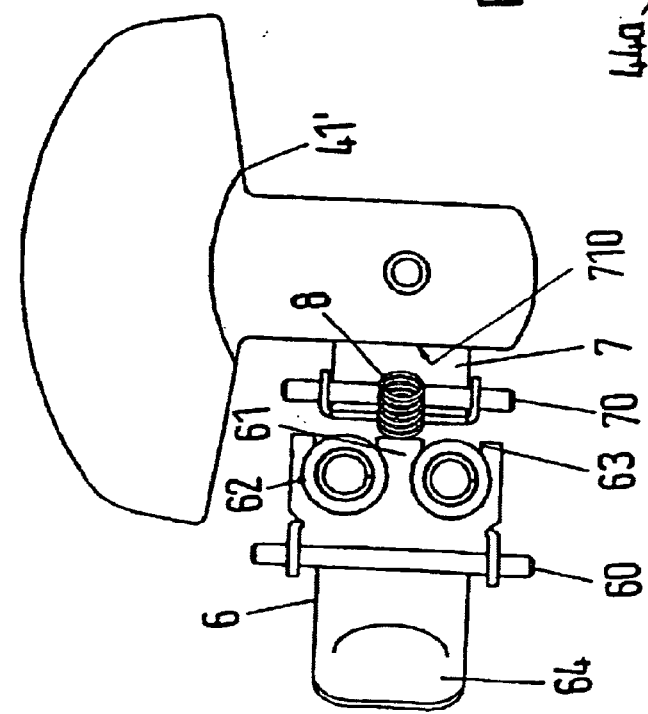

The plan view shown in FIG. 16 of the embodiment with mutual locking of the retaining element 6 and inertia element 41 or detent element 7 shows a symmetrical arrangement of the end face 710 of the first contact area 71 of the detent element 7 in relation to the rotary axis 411' of the inertia element 41'. With this association the crash locking mechanism is triggered with the same trigger conditions for a front impact or rear impact crash.

If the end face 710 of the first contact area 71 of the detent element 7 is shifted, i.e. in the event of an asymmetrical arrangement in relation to the rotary axis 411' of the inertia element 41' then different trigger conditions for the crash locking mechanism can easily be set for a front impact or rear impact crash. Thus for example in the event of a rear impact crash the triggering of the crash locking mechanism can be set with lower triggering energy and/or shorter triggering time than in the case of a front impact crash.

The invention is not restricted in its design to the preferred embodiments indicated above but a number of variations are possible which utilise the solution illustrated in the drawing and description even where the embodiments are basically quite different in design.

LIST OF REFERENCE NUMERALS

1 Bottom rail
10 Floor fastener, front
11 Floor fastener, rear
2 Top rail
20 Locking device
21 Unlocking lever
22 Holding angle
220 Detent opening
3a Side part, on the side of the belt lock
3aa Detent opening
3b Side part
30 Adjusting device for the seat height
31 Cross tube, front
32 Cross tube, rear
33a Compensating lever
33b Compensating lever
34a Drive lever
34b Drive lever
300 Drive pinion with security disc
340 Toothed segment
4 Triggering mechanism for the crash locking mechanism
40 Detent lever
400 Detent opening
401 End stop
402 Fixing point
41 Triggering body
41' Triggering body (inertia element)
410 Connecting link
411 Rotary axis
411' Rotary axis
412a Retaining element, retaining nose
412b Retaining element, retaining nose
413 Mass element of the inertia element
414 Bearing area of the inertia element
414' End face of the bearing area
42 Resiliently supported holding element
43 Spring
44a Locking element, bolt, positive locking element
44b Locking element, bolt, positive locking element
44' Detent finger
44" Detent finger
44'" Detent finger
440 Collar
444' Lever arm
444'" Lever arm
45a Compression spring
45b Compression spring
45' Spring
45" Spring
450 Support
46 Support plate
460 Detent opening
5 Belt lock
50 Belt lock holding angle
51 Fixing point
6 Retaining element
60 Retaining element axis
61 Web
62 Shoulder
63 Shoulder
64 Tension lever
65 Recess
66 Recess
7 Detent element
70 Detent element axis
71 First contact area
710 End face of the first contact area
72 Second contact area (nose)

What is claimed is:

1. A crash locking mechanism for an adjustment device of an automobile seat comprising:
   a seat having a frame and an adjustment device;
   at least one locking element for locking of the adjustment device, the at least one locking element elastically pretensioned in the locking direction;
   a triggering mechanism having a triggering body mounted for swivel movement on the seat frame; and
   a retaining element controlled by the triggering body and to which spring force of the pretensioned locking element is applied,
   wherein when a predetermined crash load is exceeded the triggering body is movable, as a result of inertial energy of the triggering body, from a coupled to an uncoupled position with the at least one locking element and the at least one locking element engages in positive fit locking with the adjustment device.

2. A crash locking mechanism according to claim 1, wherein the retaining element is connected in positive locking engagement to the locking element and wherein the positive locking connection can be released by the triggering body.

3. A crash locking mechanism according to claim 1, wherein at least one of the triggering mechanism and a connection of the triggering mechanism with the retaining element is formed so that triggering conditions are variable in dependence on a site of impact.

4. A crash locking mechanism according to claim 1, wherein the triggering mechanism includes a connecting link which has, in relation to an axis of rotation of the triggering body, areas with a radially changing distance wherein the connecting link has a rest area adjoined by one of an area of lesser and greater distance from the axis of rotation of the triggering body.

5. A crash locking mechanism according to claim 4, further comprising a resiliently mounted holding element associated with the connecting link,
   wherein when the triggering body is in a rest position, the holding element engages in the rest area of the connecting link, and
   wherein in the event of a swivel movement of the triggering body, the holding element can be moved over the adjoining area of the connecting link through an increase in spring force acting on the triggering body.

6. A crash locking mechanism according to claim 1, further comprising a connecting link associated with the triggering body, the connecting link having a rest area; and
   a resilient holding element associated with the connecting link,
   wherein the triggering body is mounted for swivel movement in two directions, and
   wherein the connecting link has adjoining areas on either side of the rest area over which the resilient holding element can be guided in dependence on the direction of the crash load.

7. A crash locking mechanism according to claim 1, further comprising a connecting link associated with the triggering body, the connecting link having a rest area that is adjoined by an area of one of a lesser and greater distance from an axis of rotation of the triggering body, wherein the connecting link is formed symmetrical relative to the rest area.

8. A crash locking mechanism according to claim 1, further comprising a connecting link associated with the triggering body, the connecting link having a rest area and formed asymmetrical relative to the rest area whereby the design of the connecting link takes into consideration the different conditions of a front impact crash and a rear impact crash.

9. A crash locking mechanism according to claim 8, wherein the dimensioning of the triggering mechanism for a rear impact crash is such that the triggering energy is increased compared to a front impact crash and the triggering time is shortened.

10. A crash locking mechanism according to claim 1 including a connecting link which has in relation to an axis of rotation of the triggering body, areas with a radially changing distance, the connecting link having a rest area that is adjoined by one of an area of one lesser and greater distance from the axis of rotation, wherein the length of the area adjoining the rest area and the retaining element are matched with each other so that, on overstepping a free end of the connecting link, detent movement of the at least one locking element is triggered.

11. A crash locking mechanism according to claim 1, further comprising a connecting link associated with the triggering body, the connecting link having a rest area that is adjoined by an area of one of a lesser and greater distance from the axis of rotation, wherein pitch of the area adjoining the rest area is selected steeper the greater the required triggering energy of the triggering mechanism.

12. A crash locking mechanism according to claim 1, further comprising a connecting link associated with the triggering body, the connecting link having a rest area that is adjoined by an area of one of a lesser and greater distance from an axis of rotation of the triggering body, wherein a length of the area adjoining the rest area is selected greater the longer the time span from the beginning of a crash to the release of detent movement of the at least one locking element.

13. A crash locking mechanism according to claim 1, further comprising:
a connecting link formed as a constituent part of the triggering body; and
a resilient holding element mounted on the seat frame.

14. A crash locking mechanism according to claim 1, wherein the seat frame further includes a side part, the crash locking mechanism further comprising:
a connecting link associated with the triggering body and mounted on the side part; and
a resilient holding element mounted on or in the triggering body.

15. A crash locking mechanism according to claim 1 further comprising:
a connecting link associated with the triggering body;
a resilient holding element; and
a spring element to produce spring tension between the resilient holding element and the connecting link.

16. A crash locking mechanism according to claim 1, wherein the seat frame includes a side part, the crash locking mechanism further comprising:
a connecting link associated with the triggering body;
a resilient holding element; and
a spring clip to produce spring tension between the resilient holding element and the connecting link, the spring clip forming the connecting link and connected to at least one of the triggering body and the side part.

17. A crash locking mechanism according to claim 1, wherein the at least one locking element is formed as an axially displaceable bolt with a collar, and wherein the collar in the coupled position of the triggering body engages with a spring on one side and with the retaining element on the other.

18. A crash locking mechanism according to claim 1, wherein the retaining element and the triggering body are mutually lockable through at least one of a positive locking connection and a force locking connection, and the mutual locking is lifted when the predetermined crash load is exceeded.

19. A crash locking mechanism according to claim 18 further comprising a detent element between the retaining element and the triggering body, the detent element able to swivel about a detent element axis and having a first contact area bearing with an end face on the triggering body, and a second contact area which forms a locking mechanism with the retaining element.

20. A crash locking mechanism according to claim 19 wherein the detent element is spring loaded in the swivel direction about the detent element axis.

21. A crash locking mechanism according to claim 20, wherein the retaining element is able to swivel about a retaining element axis running substantially parallel to the detent element axis, the retaining element having at least one shoulder adjoining a collar of the at least one locking element and a web which bears with spring tension against a nose of the detent element.

22. A crash locking mechanism according to claim 21 further comprising a tension lever mounted on one side of the retaining element axis, wherein the shoulder and the web of the retaining element are mounted on the other side of the retaining element axis.

23. A crash locking mechanism according to claim 21 wherein the nose of the detent element and of the web of the retaining element abut each other with force-locking engagement in the tensioned state of the crash locking mechanism.

24. A crash locking mechanism according to claim 19, wherein the triggering body includes an inertia element which is able to swivel about a rotary axis and which has a mass element remote from the axis and a bearing area mounted about the rotary axis.

25. A crash locking mechanism according to claim 24 wherein, in a tensioned state of the crash locking mechanism, the end face of the first contact area of the detent element adjoins an end face of the bearing area of the inertia element, and the position of the detent element in relation to the rotary axis of the inertia element can be changed.

26. A crash locking mechanism according to claim 24, wherein the rotary axis of the inertia element is mounted symmetrical relative to the end face of the first contact area of the detent element.

27. A crash locking mechanism according to claim 24, wherein the rotary axis of the inertia element is mounted asymmetric to the end face of the first contact area of the detent element.

28. A crash locking mechanism according to claim 18 wherein the at least one locking element includes two locking elements mounted side by side, and wherein the retaining element has two shoulders of the retaining element, wherein a web of the retaining element is mounted between the shoulders.

29. A crash locking mechanism according to claim 1, wherein the seat adjustment device includes a lever gearing for adjusting at least one of the height and incline of the seat.

30. A crash locking mechanism according to claim 1, wherein the seat adjustment device has a gearing which has at least one gear element of plastics.

31. A crash locking mechanism for an adjustment device of an automobile seat comprising:
a seat having a frame and an adjustment device;
at least one locking element for locking of the adjustment device, the at least one locking element elastically pretensioned in the locking direction; and
a triggering mechanism having a triggering body mounted for swivel movement on the seat frame,
wherein when a predetermined crash load is exceeded the triggering body is movable, as a result of inertial energy of the triggering body, from a coupled to an uncoupled position with the at least one locking element and the at least one socking element engages in positive fit locking with the adjustment device;
wherein the at least one locking element is formed as a swivel lever arm with detent fingers.

32. A crash locking mechanism according to claim 31, the lever arm is mounted to swivel about a rotary axis and is connected to one of a separate spring element and an integrated spring to produce an elastic pretensioning in a locking direction.

33. A crash locking mechanism according to claim 31, wherein the lever arm is fixedly tensioned and elastically curved at an end opposite the detent finger so that the lever arm can function as a compression spring.

34. A crash locking mechanism for an adjustment device of an automobile seat comprising:
a seat having a frame and an adjustment device;
at least one locking element for locking of the adjustment device, the at least one locking element elastically pretensioned in the locking direction; and
a triggering mechanism having a triggering body mounted for swivel movement on the seat frame,
wherein when a predetermined crash load is exceeded the triggering body is movable, as a result of inertial energy of the triggering body, from a coupled to an uncoupled position with the at least one locking element and the at least one locking element engages in positive fit locking with the adjustment device,
wherein the seat frame includes a detent opening and a top rail, the crash locking mechanism further comprising:
a support plate connected to the seat frame, the support plate having a detent opening; and
a detent lever coupled to the top rail and having a detent opening,
wherein the at least one locking element in a crash-locked state passes through the detent opening in the seat frame, the detent opening in a support plate, and the detent opening in the detent lever, so that the at least one locking element in the event of a crash is shear-stressed.

35. A crash locking mechanism according to claim 34, wherein the detent lever has several detent openings which are arranged along a path over which the at least one locking element travels in the displacement path of the seat adjustment device.

36. A crash locking mechanism according to claim 35, wherein the detent openings of the detent lever are substantially larger than the detent opening in the seat frame in relation to the path of the at least one locking element.

37. A crash locking mechanism according to claim 35, wherein the at least one locking element includes several locking elements whose division differs from the division of the detent lever so that in any adjusted position of the seat adjustment device at least one locking element can engage in a detent opening of the detent lever.

38. A crash locking mechanism according to claim 35, wherein the free end of the detent lever is provided with an end stop which restricts the displacement of the corresponding adjustment device in the corresponding direction.

* * * * *

UNITED STATES PATENT AND TRADEMARK OFFICE
CERTIFICATE OF CORRECTION

PATENT NO.    : 6,666,508 B1
DATED         : December 23, 2003
INVENTOR(S)   : Hofmann et al.

It is certified that error appears in the above-identified patent and that said Letters Patent is hereby corrected as shown below:

<u>Title page,</u>
Item [57], ABSTRACT, delete the ABSTRACT and replace as follows:

> A crash locking mechanism for an adjustment device of an automobile seat, has a triggering body with a triggering mechanism mounted for swivel movement on a part of the seat frame and which when a predetermined crash load is exceeded leaves the rest position as a result of its inertial energy, whereby a positive fit locking of the adjustment device is made possible by means of at least one locking element. The triggering mechanism, when the predetermined crash load is exceeded, can be uncoupled from the at least one locking element which is spring elastically pretensioned in the locking direction. A retaining element which is associated with the locking element can be controlled by the triggering body to which the spring force of the pretensioned locking element is applied. Furthermore a connecting link and a spring-loaded holding element acting thereon is provided interacting with the triggering body in order to be able to adapt the triggering energy and the triggering time exactly to the different requirements.--

<u>Column 11,</u>
Line 55, delete "to claim 1", insert -- to claim 1, --

<u>Column 12,</u>
Lines 15 and 61, delete "to claim 18", insert -- to claim 18, --
Line 22, delete "to claim 19", insert -- to claim 19, --
Lines 32 and 37, delete "to claim 21", insert -- to claim 21, --
Line 37, delete "to claim 24", insert -- to claim 24, --

UNITED STATES PATENT AND TRADEMARK OFFICE
CERTIFICATE OF CORRECTION

PATENT NO. : 6,666,508 B1
DATED : December 23, 2003
INVENTOR(S) : Hofmann et al.

It is certified that error appears in the above-identified patent and that said Letters Patent is hereby corrected as shown below:

Column 13,
Line 16, delete "socking" insert -- locking --

Signed and Sealed this

Twenty-eighth Day of June, 2005

JON W. DUDAS
*Director of the United States Patent and Trademark Office*